United States Patent [19]

Inoue et al.

[11] Patent Number: 4,683,408

[45] Date of Patent: Jul. 28, 1987

[54] STEPPING MOTOR CONTROL APPARATUS

[75] Inventors: Akira Inoue; Shinichi Nomura; Osamu Hanami, all of Narashino, Japan

[73] Assignee: Seiko Seiki Kabushiki Kaisha, Chiba, Japan

[21] Appl. No.: 784,179

[22] Filed: Oct. 4, 1985

[30] Foreign Application Priority Data

Dec. 25, 1984 [JP] Japan .................................. 59-279313

[51] Int. Cl.⁴ ................................................ H02P 8/00
[52] U.S. Cl. ...................................... 318/696; 318/685
[58] Field of Search ................................... 318/696, 685

[56] References Cited

U.S. PATENT DOCUMENTS 3,345,547 10/1967 Dunne ..................................... 318/696
4,172,990 10/1979 Everett et al. ......................... 318/685
4,277,732 7/1981 Hittel et al. ........................... 318/696
4,465,959 8/1984 Yajima .................................... 318/696

Primary Examiner—William M. Shoop, Jr.
Assistant Examiner—Paul M. Bergmann
Attorney, Agent, or Firm—Bruce L. Adams; Robert E. Burns; Emmanuel J. Lobato

[57] ABSTRACT

A stepping motor control apparatus comprises current computing means for computing a motor-coil exciting current corresponding to the holding position from a predetermined wave form pattern; micro step driving means for driving the stepping motor toward the final holding position through a micro step transfer distance shorter than a regular step transfer interval by exciting the motor-coil by application of the exciting current obtained from the computing means; and acceleration control means for controlling the stepping motor acceleration by switching on and/or off the exciting current of the motor-coil in accordance with an acceleration signal.

14 Claims, 10 Drawing Figures

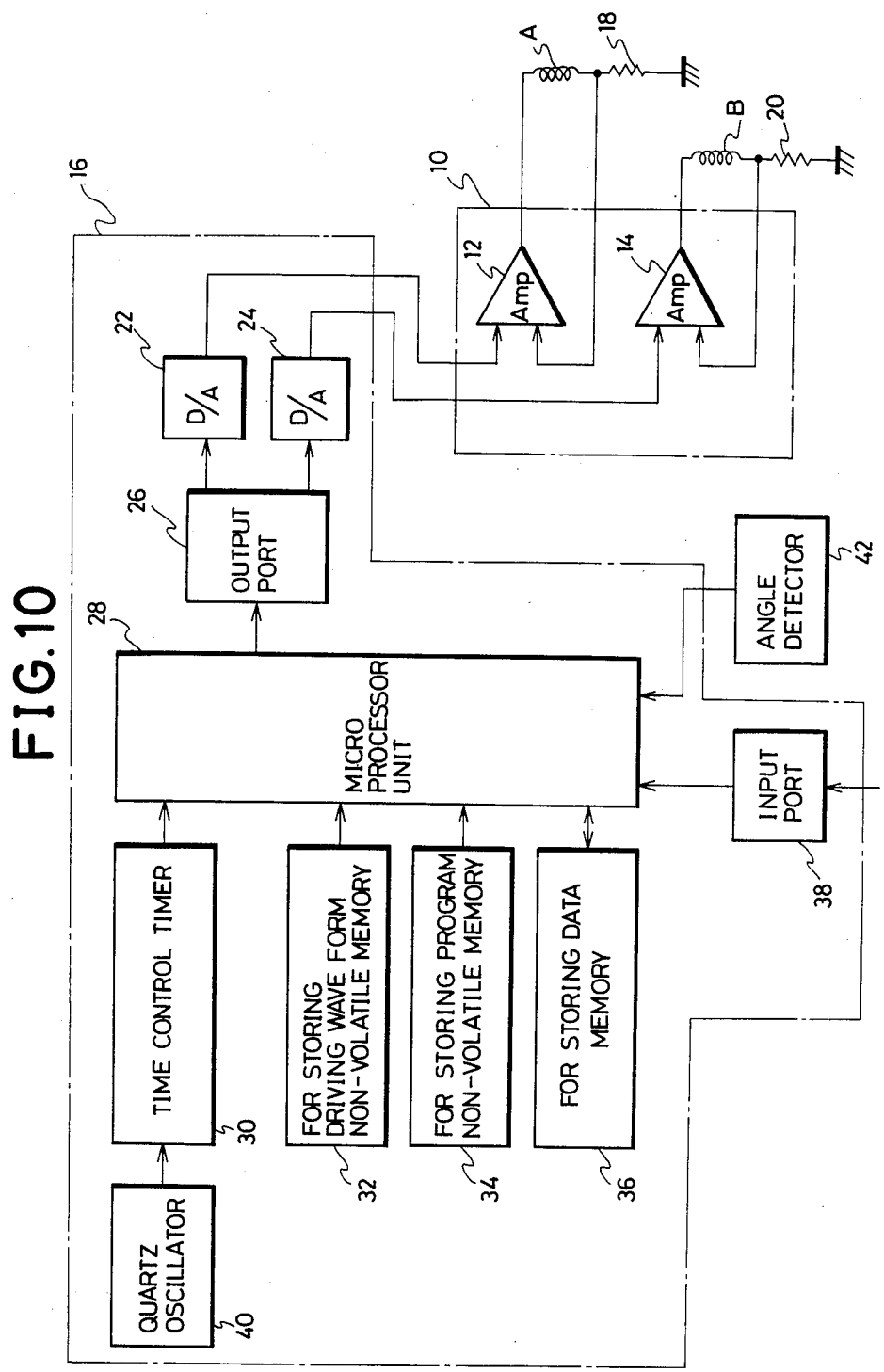

STEPPING MOTOR CONTROL APPARATUS

BACKGROUND OF THE INVENTION

This invention relates to a stepping motor control apparatus for controlling the stepping motor, and especially relates to a stepping motor control apparatus for enabling the stepping motor to be intermittently driven during a micro transfer period obtained by dividing regular step transfer period.

In the stepping motor, it is comparatively easy to position a rotor in good accuracy and is easy to execute digital control thereof so that the stepping motor is utilized in various application fields and the control thereof is carried out as follows.

This stepping motor is driven by switching on and/or off exciting current of motor-coils. Namely, if two-phase stepping motor is driven via bipolar stator, the exciting currents of coils A and B are respectively controlled by switching on and/or off the exciting currents in accordance with the current patterns 0, 1, 2 and 3 of the Table 1.

TABLE 1

| CURRENT PATTERN | | 0 | 1 | 2 | 3 |
|---|---|---|---|---|---|
| COIL | A | + | 0 | − | 0 |
| | B | 0 | + | 0 | − |

FIG. 2 illustrates a static torque characteristic Tr of this stepping motor and the torque Tr is a function $Tr(\theta)$ of angular position $\theta$ of the rotor. In FIG. 2, the maximum torque of the torque Tr is designated by the value $Tr_0$ and the torque characteristic Tr shows generally sine wave characteristic having a variable of the rotor angular position $\theta$. At angular positions $\theta_0$, $\theta'_0$, the rotor of the stepping motor stably stops, and thus each position becomes each detent position.

Namely, when some external torque is occasionally applied to the rotor which is stopped in one of the detent positions, the reaction torque toward the reverse direction, that is, toward the detent position, is induced. For example, when some external torque is applied to the rotor at the position $\theta_0$ in the direction of the position $\theta_1$, positive reaction torque is induced and when some external torque is applied to the rotor at the position $\theta_0$ in the direction of the position $\theta_2$, the negative reaction torque is induced and thus, the rotor is stably converged toward the detent position.

As a current pattern corresponding to the detent position $\theta_0$, the pattern 0 in the Table 1 is selected and the torque characteristic of this current pattern 0 is shown in FIG. 3 by $Tr_0(\theta)$.

Additionally, in FIG. 3, each torque characteristic of current patterns 1, 2 and 3 is shown by the curves $Tr_1(\theta)$, $Tr_2(\theta)$ and $Tr_3(\theta)$ respectively and it is understood from this figure that if the current pattern is successively changed to 0, 1 and 2 in order and/or changed to 2, 1 and 0 in order, the rotor is successively transferred to detent positions $\theta_{00}$, $\theta_{01}$ and $\theta_{02}$ in order and/or transferred to $\theta_{02}$, $\theta_{01}$ and $\theta_{00}$ in order.

Accordingly, by controlling the current pattern as set forth above, that is, by executing the on-off control of the exciting currents of the motor-coils A and B, the rotor is intermittently driven toward the forward direction or the reverse direction of the angular position $\theta$ in FIG. 3. In case such a regular stepwise driving, the rotor can be stably hold at each detent position and this manner is obvious from FIG. 4 (in this figure, the rotor is shown that it is driven from the detent position $\theta_{00}$ to the detent position $\theta_{01}$).

As mentioned above, by executing the on-off control of the exciting current of each motor-coil of the stepping motor, it becomes possible that the rotor is controlled so as to be successively transferred in a regular stepwise manner from the present detent position to the next detent position. In addition, the holding torque at the detent position is so large that it becomes possible to carry out high accurate positioning control of the rotor at high speed in spite of the open-loop control.

But, in a stepping motor, the step number per one rotation of the rotor (the detent position number) is in the range from tens to hundreds and is one thousand even in its maximum value such that it is difficult to execute finer positioning of the rotor.

Therefore, it is proposed to drive the stepping motor in a micro-stepwise or variable step manner and thereby, the rotor is intermittently driven during the micro-step transfer period through a variable angular transfer distance which is obtained from dividing a fixed angular interval between adjacent detent positions of a regular stepwise rotation such that the higher resolvable or finer positioning becomes possible.

In this micro-stepwise driving, the exciting current of the holding position defining a final rotor is derived from the predetermined wave form pattern (for example, a sine wave or a triangular wave) and each motor-coil is excited by these exciting currents. For example, in two phase driving, these exciting currents are not same each other and a desired holding position between adjacent regular detent positions is determined by these exciting currents.

For instance, if the fixed regular stepping transfer interval is divided by number n and an arbitrary holding position within the regular stepping interval is defined by m and a maximum exciting current is defined by $I_0$, to the A coil of two-phase motor, an exciting current $I_0 \cos(\pi m/2n)$ is applied and to the B phase coil thereof, an exciting current $I_0 \sin(\pi m/2n)$ is applied. By the way, each of conditions $m=1n$, $m=2n$ and $m=3n$ corresponds respectively to each of the current patterns 1, 2 and 3 as shown in Table 1.

Furthermore, the micro- or variable step driving is described in conjunction with the characteristic diagram of FIG. 5. In this figure, when each exciting current is changed from the still pattern corresponding to $m=m_0$ and $\theta=\theta_0$ to the pattern corresponding to $m=m_1$ ($|m_1-m_0| \leq n$) so as to allow to be led to the A phase and B phase, the torque characteristic thereof is changed from the characteristic $Tr = Tr_{m_0}(\theta)$ which is derived in case of $m=m_0$, to the characteristic $Tr = Tr_{m_1}(\theta)$. Thus, in case of $\theta = \theta_{m_0}$, the rotor generates therein a torque $Tr_0 \sin\{\pi(m_1-m_0)/2n\}$ so as to be transferred toward the holding position $\theta_{m_1}$ in a micro-stepwise manner.

But, as the division number n becomes large and the magnitude $m_1-m_0$ becomes small, the acceleration torque $Tr_0 \sin\{\pi(m_1-m_0)/2n\}$ becomes smaller than the acceleration torque generated in case of regular stepping driving shown in FIG. 3 set forth above, and thereby the acceleration of the rotor in forward and reverse directions becomes sluggish. This drawback is illustrated by the characteristic curve 100 of FIG. 6 and the rotor is gradually transferred from present holding position $\theta_{m_0}$ to the final holding position $\theta_{m_1}$ and is stably converged to the final holding position $\theta m_1$ after the lapse of long time.

Accordingly, in a micro-stepwise or variable step driving of this kind, the positioning of the rotor becomes highly precise, but positioning control at high transfer speed becomes impossible and a control error will occur.

SUMMARY OF THE INVENTION

This invention is proposed in view of the disadvantages and the object of the invention is intended to provide a stepping motor control apparatus capable of executing the micro-stepwise driving at high speed without the control error thereof.

BRIEF DESCRIPTION OF THE DRAWINGS

FIG. 10 is a block diagram to explain the second embodiment suitable for the apparatus in accordance with this invention.

DETAILED DESCRIPTION OF PREFERRED EMBODIMENTS

Figure 1:
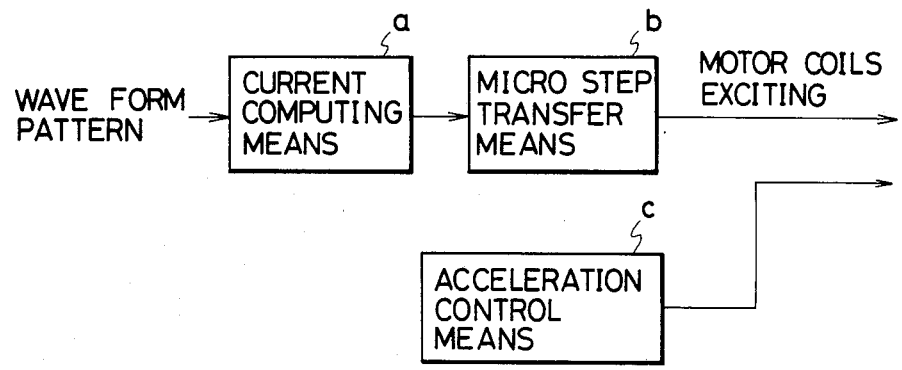
FIG. 1 is a a block diagram showing an embodiment of the present invention.

In order to attain the object, as shown in FIG. 1, this invention is characterized in that the stepping motor control apparatus comprises current computing means (a) for computing a waveform of motor-coil exciting current corresponding to the final holding position by selecting the predetermined wave form pattern; (a) micro-stepwise driving means (b) for driving the stepping motor toward the final holding position through micro-step transfer distance derived from dividing the regular step transfer interval by exciting each motor-coil with each exciting current derived from the computing means; and acceleration control means (c) for controlling the stepping motor acceleration by switching on and/or off the exciting current for each motor-coil in accordance with an acceleration signal.

Referring now, the embodiments suitable for the apparatus of this invention will be described in conjunction with the drawings.

Figure 7:
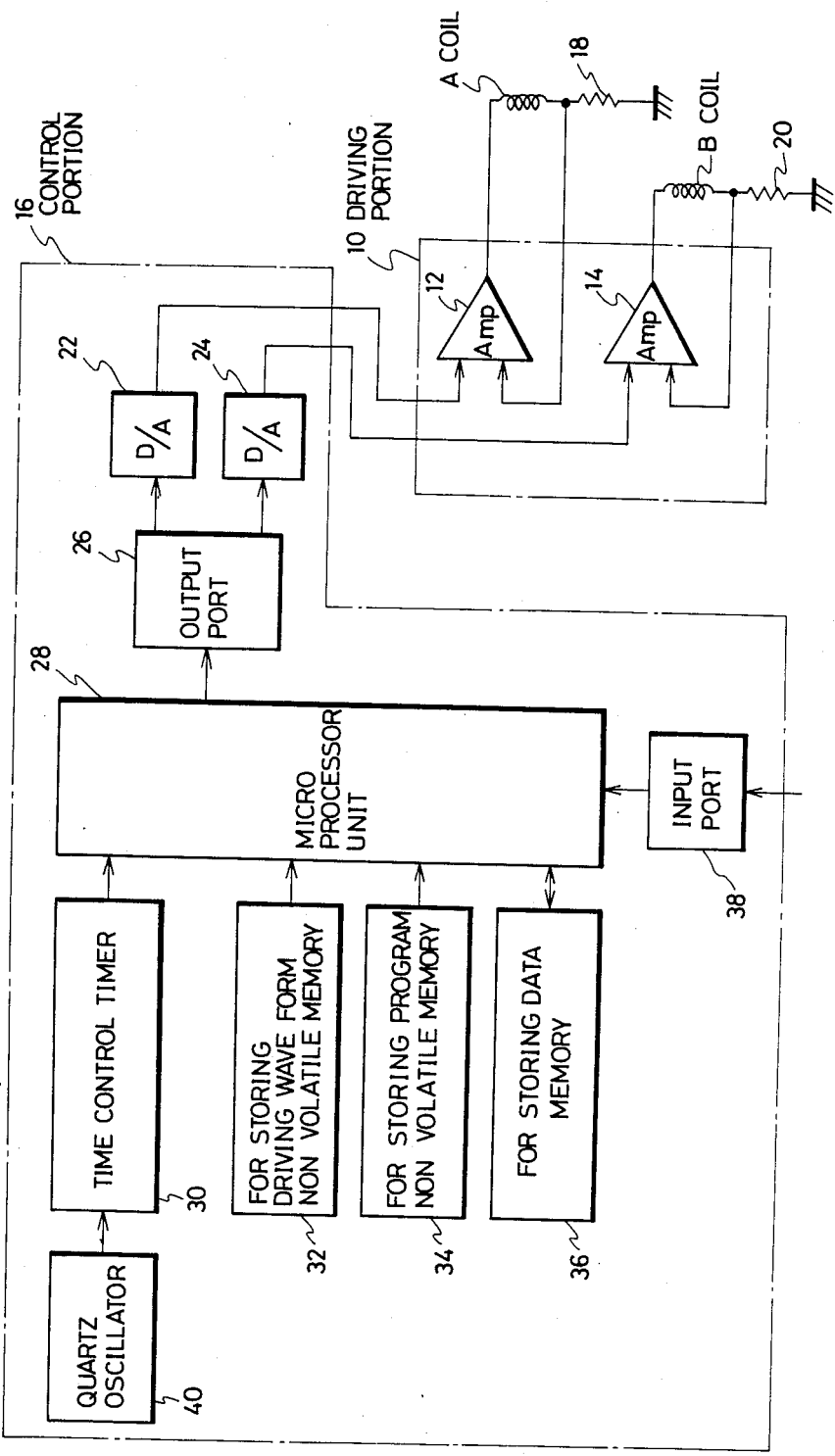
FIG. 7 is a block diagram to explain the first embodiment suitable for the apparatus in accordance with this invention.

FIG. 7 shows a first embodiment suitable for the apparatus of this invention, wherein coils A and B of thw two phase stepping motor are energized by a driving portion 10. Within this driving portion 10, there is provided current control amplifiers 12 and 14 which apply drive current to the coils A or B in response to a control signal from a control portion 16 together with a exciting current detecting signal so as to excite the coils A and B respectively while these exciting current detecting signals are provided respectively from resistances 18 and 20.

Each control signal for the amplifiers 12 and 14 is output from D/A converters 22 and/or 24 within the control portion 16, into which a digital control signal from a micro processor unit 28 is input via an output port 26.

This micro processor unit 28 is provided with a timer 30 for time control, a non-volatile memory 32 for storing a driving wave form, a non-volatile memory 34 for storing program, a memory 36 for storing data and an input port 38, and a clock pulse from a quarz oscillator 40 is input to the timer 30 for time control.

At the timer 30 for time control, a preset time is set by virtue of micro-processor unit 28 and the timer 30 for time control feeds a time-up signal to the micro processor unit 28 when the timer 30 reaches the setting time. Further, at the non-volatile memory 32 for storing the driving wave form, the wave form data of the wave form pattern is stored such that the micro processor unit 28 controls the exciting currents of motor-coils A and B for determining the final holding position. Moreover, at the non-volatile memory 34 for storing the program, there is stored a program such that the micro processor unit 28 executes the control works in accordance with the program. At the memory 36 for storing data, the transfer data for controlling the micro-step rotation or variable step rotation is written by the micro processor unit 28 or is read out therefrom. Also at the input port 38, there is stored various external input data and these data are input to the micro processor unit 28.

The embodiment of the invention is constituted as set forth above and the operation therof is hereinafter described.

Figure 8:
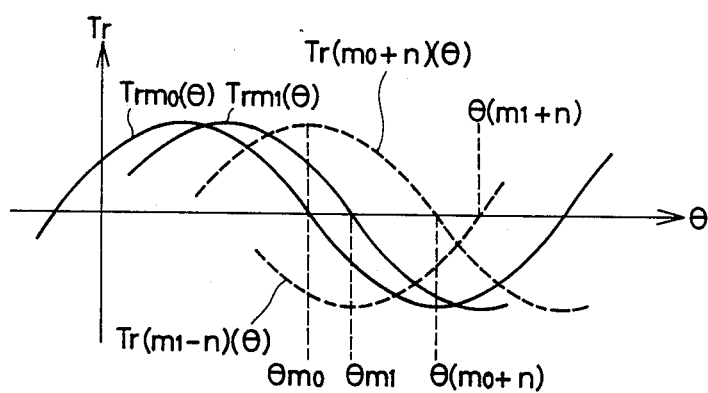
FIG. 8 is a torque characteristic diagram to explain the operation of the first embodiment.
Figure 9:
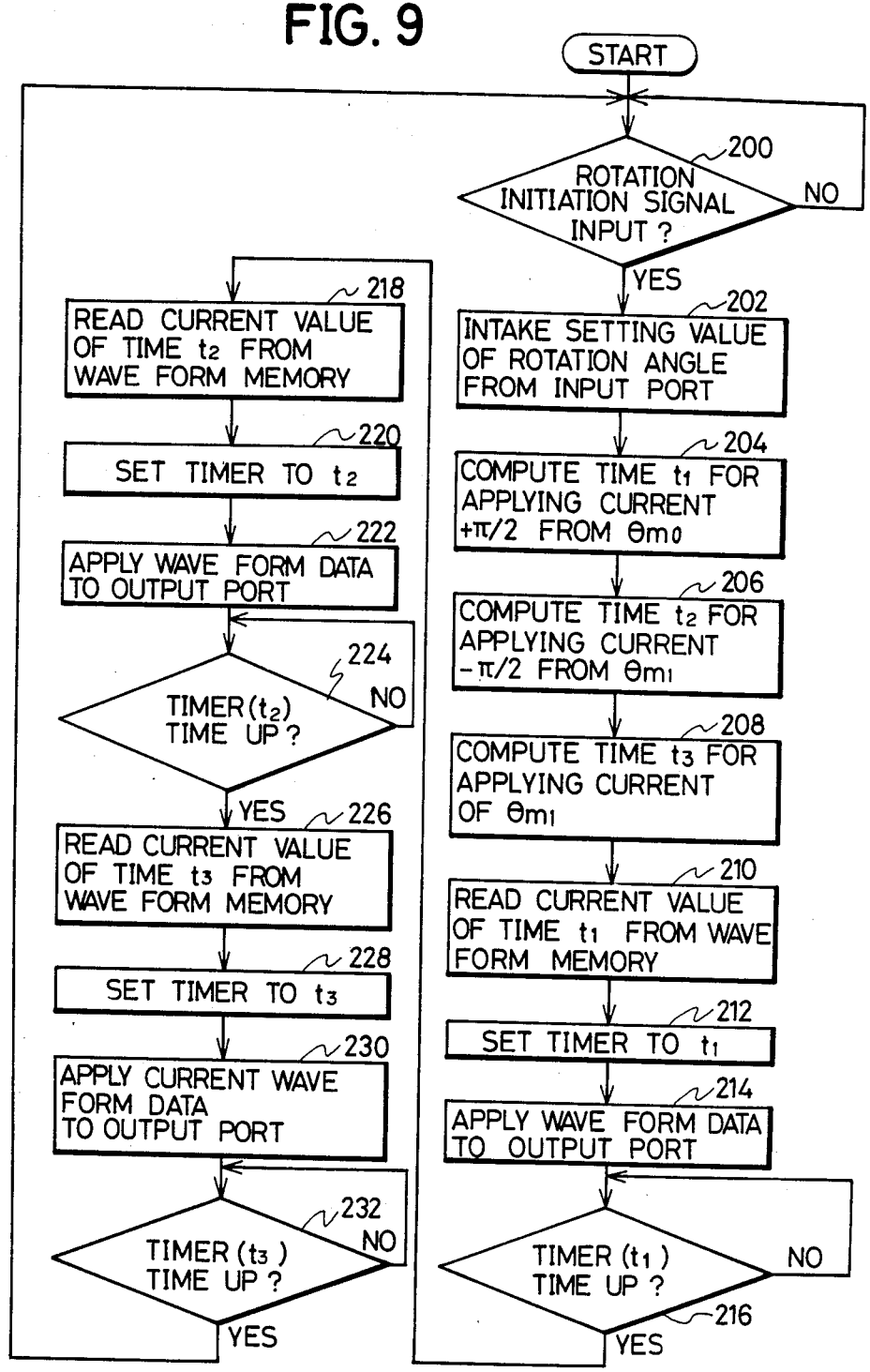
FIG. 9 is a flow chart to explain the processing order of the micro processor unit shown in FIG. 7.

Now the rotor of the stepping motor is positioned at a temporary holding position $\theta m_0$ as shown in FIG. 8. In FIG. 9, there is described processing instruction of the micro processor unit 28 of the FIG. 7. In the first step 200, a micro-transfer rotation initiation signal is admitted to the micro processor unit 28 with respect to the holding position $\theta m_1$ final and thereafter it advances to the step 202. In the step 202, the setting value or transfer data defining the rotation angle on angular transfer distance between the temporary and final holding positions $\theta m_0$, $\theta m_1$ is fed from the input port 38. In the following step 204, the first time interval $t_1$ for applying the AC current corresponding to a position which is shifted by $+\pi/2$ of electrical phase from $\theta m_0$, is computed and in the second step 206, the time interval $t_2$ for applying the current corresponding to a position which is shifted by $-\pi/2$ of electrical phase from $\theta m_1$ is computed and furthermore, in the step 208, the third time interval $t_3$ for applying the current corresponding to the position $\theta m_1$, is computed.

Besides, these times $t_1$, $t_2$ and $t_3$ are stored within the memory 36 for storing the data.

In the step 210, the current value corresponding to the first time interval $t_1$ is read from the non-volatile memory 32 storing driving wave form and in the step 212, the timer 30 setting time of the timer for controlling the time is set to $t_1$. In the step 214, the exciting wave form data (exciting current rate at the time) are applied to the output port 26. Further, in the step 216, the timer 30 for controlling the time detects the state of time-up.

The operation of the steps 210, 212, 214 and 216 is as follows.

Figure 2:
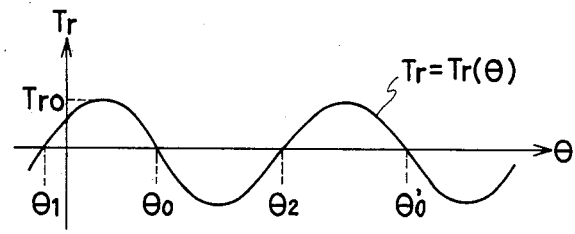
FIG. 2 is an explanatory figure of the torque characteristic of the stepping motor.
Figure 3:
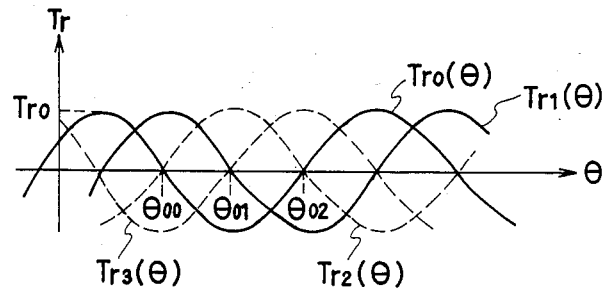
FIG. 3 is an explanatory figure to explain the regular stepwise driving operation.
Figure 4:
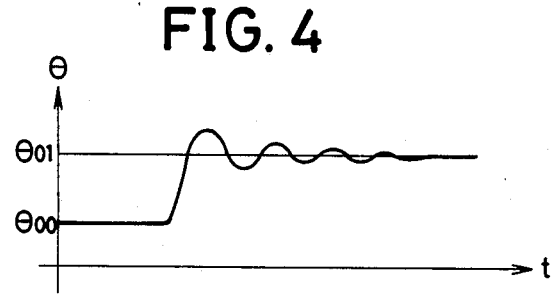
FIG. 4 is an explanatory figure to explain the converging operation of the the rotor at the detent position in the regular stepwise driving operation.

In FIG. 8, the exciting current or the accelerating drive current having the phase which differs from the phase of the holding drive current for holding the rotor at the temporary holding position $\theta m_0$ by the electrical angle $+\pi/2$ (namely, the current pattern corresponding to the position $\theta(m_0+n)$ is applied to the coils A and B such that the torque characteristic Tr is changed from the characteristic $Trm_0(\theta)$ to the characteristic $Tr(m_0+n)(\theta)$. Thus, the rotor is accelerated from the temporary holding position $\theta m_0$ to the final holding position $\theta m_1$ under the maximum forward drive torque $Tr_0$ shown in the FIG. 2. Thereafter, by the use of the timer 30 in which $t_1$ is set to, the angular rotor position $\theta$ is monitored whether it reaches the position $(\theta m_0+\theta m_1)/2$ or not. When the reach of the rotor to that position is admitted, in the step 218 corresponding to FIG. 9, the current value of the time interval $t_2$ is read from the non-volatile memory 32 storing the driving wave form. Further, in the step 220, a setting time of the timer 30 for controlling the time 30 is set to the time interval $t_2$ and the exciting current rate is applied to the output port 26. Thereafter, in the step 224, the timer 30 for controlling the time in accordance with the setting time of $t_2$ detects the time-up thereof.

The operations in accordance with steps 218, 220, 222 and 224, is described as follows.

When the rotor reaches the position $(\theta m_0+\theta m_1)/2$, the exciting current or decelerating drive current with the phase which differs by the electrical angle $-\pi/2$ from the phase of the holding drive current for holding the rotor at the final holding position $\theta m_1$ that is, the exciting current of the current pattern corresponding to the position $\theta(m_1-n)$, is applied to the coils A and B and thereby the torque characteristic Tr is changed from the forward drive characteristic $Tr(m_0+n)(\theta)$ to the reverse drive characteristic $Tr(m_1-n)(\theta)$.

Consequently, the rotor receives the reverse drive torque after passing the position $(\theta m_0+\theta m_1)/2$ so as to execute the deceleration thereof. The deceleration is carried out till the timer 30 for controlling the time in accordance with the setting time of $t_2$, reaches the time-up state and by the time-up, the deceleration operation is finished.

In FIG. 9, in the step 226, the current value corresponding to the time interval $t_3$ is read from the non-volatile memory 32 storing the driving wave form and in the step 230, the time interval $t_3$ is set to the timer 30 controlling the time 30 and in the step 232, the timer 30 for controlling the time in accordance with the setting time of $t_3$ detects the time-up thereof.

The operations of the steps 226, 228, 230 and 232 are described as follows.

Figure 5:
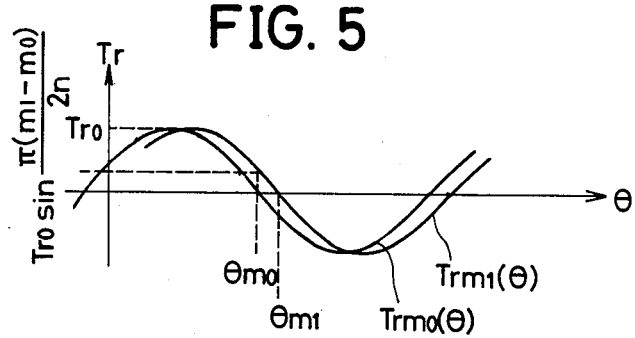
FIG. 5 is a torque characteristic diagram to explain the micro step operation.
Figure 6:
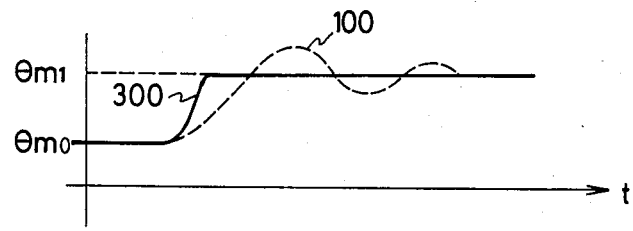
FIG. 6 is an explanatory figure to explain the converging operation of the rotor at the holding position during micro step transfer.

When the timer 30 for controlling the time is in the time-up state and the rotor reaches the final holding position $\theta m_1$, the exciting current or holding drive current is applied to the coils A and B and thereby, the torque characteristic Tr is changed from the characteristic $Tr(m_1-n)(\theta)$ to the characteristic $Trm_1$. The pull-in or holding torque at this time, is the the same holding torque as applied to the other in the micro-stepwise driving shown in FIG. 5 and the holding torque is smaller than the maximum forward and reverse drive torque $Tr_0$, but it is enough to make the rotor stationary in the final holding position $\theta m_1$. During above mentioned control operations, the rotor of the stepping motor is, as shown in the characteristic 300 of FIG. 6, accelerated with the maximum forward driving torque, from the temporary holding position $\theta m_0$ toward the final holding position $\theta m_1$ and the rotor is successively decelerated by the application of the maximum reverse driving torque and thereafter, the rotor is convergedly positioned at the final holding position $\theta m_1$ in a short time under the pull-in or holding torque of the micro-stepwise driving. Therefore, the rotor is prevented from vibrating around the final holding position $\theta m_1$.

As set forth above, according to this embodiment, it becomes possible to rapidly position and control the rotor without following "the syncronization out", because after the rotor is accelerated and decelerated by comparatively large driving torque used in the regular stepwise driving, the rotor is convergedly positioned at the final holding position by the holding torque used in the micro-stepwise driving.

While, in this embodiment, the constant exciting current for generating the maximum torque during the time of acceleration and/or deceleration of the rotor, is applied to the coils A and B, it is preferably suitable to constitute the apparatus so as to regulate the exciting current a little smaller than that in this embodiment.

Also, it is preferably suitable that the reverse acceleration of the rotor (that is deceleration) initiates before the rotor reaches the final holding position $\theta m_1$ so as to allow the rotor to be prevented from overrunning therefrom.

Moreover, the acceleration initiation position is not limited to the temporary holding position $\theta m_0$ and it is also preferably suitable to intitiate the acceleration at an arbitrary position.

In FIG. 10, there is disclosed the second embodiment of the apparatus in accordance with the invention, wherein there is provided an angle detector 42 for detecting the rotation angle or angular position of the rotor. A corresponding detecting signal thereof applied to the micro processor unit 28 enable the micro processor unit 28 to select the transfer timing from acceleration to deceleration of the rotor, the transfer timing from deceleration to micro-step transfer holding and.

According to this embodiment of the invention, it becomes possible to use the actual driving position of the rotor as a feed back signal such that it is able to improve controlling accuracy.

Meanwhile, it is preferably suitable to constitute the angle detector 42 by an encoder cooperative with the rotor of the stepping motor.

As set forth above, according to this invention, a rapid and highly accurate control of the stepping motor is achieved without control error thereof and the like.

Further, this invention is applicable to a stepping motor of the linear type.

What is claimed is:

1. A stepping motor control apparatus for controlling the stepwise rotation of a rotor of a stepping motor, comprising: driving means for applying different drive currents to a stepping motor to selectively effect regular step rotation of the stepping motor rotor at a fixed angular interval and a variable step rotation of the rotor from a temporary hold position to a desired final hold position through a variable angular transfer distance which is shorter than the fixed angular interval; means for providing transfer data of the variable step rotation including data representative of the temporary hold position, and data defining the angular transfer distance and the final hold position; and control means responsive to the transfer data for producing an accelerating drive current effective to accelerate the movement of the rotor from the temporary hold position through a part of the angular transfer distance, a decelerating drive current effective to decelerate the movement of the rotor to the final hold position through another part of the angular transfer distance, and a holding drive current effective to hold the rotor at the final hold position so as to enable the driving means to sequentially apply the accelerating, decelerating and holding drive currents to the rotor.

2. A stepping motor control apparatus according to claim 1; wherein the driving means includes means for applying forward and reverse drive currents to the stepping motor to produce forward and reverse drive torques so as to effect forward and reverse regular step rotation of the rotor respectively.

3. A stepping motor control apparatus according to claim 2; wherein the control means includes means for producing accelerating and decelerating drive currents effective to enable the stepping motor to produce the same forward and reverse drive torques as those of the forward and reverse drive currents, respectively.

4. A stepping motor control apparatus according to claim 1; wherein the control means includes time control means responsive to the data defining the angular transfer distance for determining an angular transfer time interval during which the variable step rotation is effected.

5. A stepping motor control apparatus according to claim 4; wherein the time control means includes means determining a first time interval during which the accelerating drive current is applied to the stepping motor, a second time interval during which the decelerating drive current is applied to the stepping motor, and a third time interval during which the holding drive current is applied to the stepping motor.

6. A stepping motor control apparatus according to claim 1; wherein the driving means includes means for applying AC drive currents having different phases.

7. A stepping motor control apparatus according to claim 6; wherein the control means includes hold position control means for producing a holding AC drive current having a specified phase effective to hold the rotor at a specified hold position.

8. A stepping motor control apparatus according to claim 7; wherein the hold position control means includes final hold position control means responsive to the data defining the final hold position for producing a holding AC drive current having a specified phase effective to hold the rotor at the final hold position.

9. A stepping motor control apparatus according to claim 6; wherein the control means includes acceleration control means responsive to the data representative of the temporary hold position for producing an accelerating AC drive current having a specified phase effective to accelerate the rotor from the temporary hold position.

10. A stepping motor control apparatus according to claim 6; wherein the control means includes deceleration control means responsive to the data defining the final hold position for producing a decelerating AC drive current having a specified phase effective to decelerate the rotor as it approaches the final hold position.

11. A stepping motor control apparatus according to claim 6; wherein the control means includes calculating means for calculating phase values of the different AC drive currents.

12. A stepping motor control apparatus according to claim 11; wherein the calculating means includes memory means for storing data representative of the different AC drive currents.

13. A stepping motor control apparatus according to claim 1; wherein the means for providing transfer data includes detecting means for detecting the temporary hold position of the rotor and producing corresponding data.

14. In a stepping motor control apparatus for effecting micro-step transfer of a rotor of a stepping motor to position the rotor at a final holding position between adjacent detent positions occupied by the rotor during regular step transfer, and having exciting current generating means for driving the rotor from a temporary holding position to the final holding position, the improvement wherein said exciting current generating means comprises: acceleration means for producing a first exciting current to drive said rotor in a direction of the final holding position, the first exciting current having a current value effective to produce a maximum driving torque of the stepping motor when the rotor is positioned at the temporary holding position; deceleration means for producing a second exciting current to drive said rotor in a direction opposite to the direction of the final holding position, the second exciting current having a current value effective to produce a maximum driving torque of the stepping motor when the rotor is positioned at the final holding position; and holding means for producing a third exciting current effective to hold said rotor at said final holding position.

* * * * *